(12) United States Patent
Larsen (10) Patent No.: US 7,417,646 B1
(45) Date of Patent: Aug. 26, 2008

(54) BACKGROUND RENDERING IN VIDEO COMPOSITING

(75) Inventor: Eric Larsen, Clackamas, OR (US)

(73) Assignee: Apple Inc., Cupertino, CA (US)

( * ) Notice: Subject to any disclaimer, the term of this patent is extended or adjusted under 35 U.S.C. 154(b) by 368 days.

(21) Appl. No.: 11/107,331

(22) Filed: Apr. 16, 2005

(51) Int. Cl.
*G09G 5/00* (2006.01)
*G06T 1/20* (2006.01)

(52) U.S. Cl. .................. 345/619; 345/506; 345/530; 345/473

(58) Field of Classification Search .............. 345/619, 345/530, 506
See application file for complete search history.

(56) References Cited

U.S. PATENT DOCUMENTS

| | | | |
|---|---|---|---|
| 6,556,205 B1 * | 4/2003 | Gould et al. ............. | 345/473 |
| 6,683,619 B1 * | 1/2004 | Samra .................... | 345/619 |
| 6,700,579 B2 * | 3/2004 | Gould .................... | 345/506 |
| 6,791,552 B2 * | 9/2004 | Gould et al. ............. | 345/506 |
| 6,828,984 B2 * | 12/2004 | Samra .................... | 345/619 |
| 6,867,782 B2 * | 3/2005 | Gaudette et al. ......... | 345/530 |
| 7,103,839 B1 * | 9/2006 | Natkin et al. ............ | 715/723 |

* cited by examiner

*Primary Examiner*—Jin-Cheng Wang
(74) *Attorney, Agent, or Firm*—Adeli & Tollen LLP (57) ABSTRACT

Some embodiments of the invention provide a method of editing video through a multi-stage editing process. The method selects a particular stage in the editing process. A particular editing operation is performed on a set of video images during the particular stage. After the selection of the particular stage, the method uses a background rendering process to render the result of the particular editing operation on the particular set of video images. The background rendering process is a process that the method performs separately from the multi-stage video editing process, so that a user may continue editing the video sequence while the rendering occurs. Some embodiments provide a preview of the rendering process in a preview window. Some of these embodiments update the preview in real time. In some embodiments, the rendering occurs to a temporary location and then stores to a persistent storage. In some of these embodiments, an entry for the stored render's location is logged in a list of entries that allows the stored render to be catalogued and retrieved from the persistent storage. The temporary location and the persistent storage can be part of a non-volatile memory such as a hard drive.

25 Claims, 9 Drawing Sheets

BACKGROUND RENDERING IN VIDEO COMPOSITING

BACKGROUND

Video editing is an arduous and time consuming process. Tools have been developed to assist and enable those performing the difficult task of video editing. However, video editing tools can themselves be highly complex and thus, provide their own challenges to the users of such tools.

One difficulty in video editing is providing information to the video editor (user) regarding how the currently applied video editing functions affect the video sequence currently being edited or any number of video sequences previously edited. At any given time during the video editing process, the user may need a preview of the results of the previous editing work, i.e., the edited frames. Often, a succeeding section of the video sequence depends upon the output of the video editing functions on a preceding section of the video sequence. Thus, a user could spend a significant amount of time merely waiting while renders are generating. This waiting is particularly inefficient if the user only wishes to preview a small section of video from a long video sequence. The video editing process and wait time can be even more drawn out and obtuse if the prior renders and tasks cannot be stored and retrieved in an organized fashion but must constantly be re-rendered, even when unchanged. The waiting is also inefficient if the entire video project must be re-rendered to reflect every individual change.

Thus, there is a need for a video editing process that allows background rendering to occur while other video editing is performed. There is also a need for a method that stores and retrieves multiple renders at various times, for different data, to and from different locations.

SUMMARY OF THE INVENTION

Some embodiments of the invention provide a method of editing video through a multi-stage editing process. The method selects a particular stage in the editing process. A particular editing operation is performed on a set of video images during the particular stage. After the selection of the particular stage, the method uses a background rendering process to render the result of the particular editing operation on the particular set of video images. The background rendering process is a process that the method performs separately from the multi-stage video editing process, so that a user may continue editing the video sequence while the rendering occurs. Some embodiments provide a preview of the rendering process in a preview window. Some of these embodiments update the preview in real time.

In some embodiments, the rendering occurs to a temporary location and then stores to a persistent storage. In some of these embodiments, an entry for the stored render's location is logged in a list of entries that allows the stored render to be catalogued and retrieved from the persistent storage. The temporary location and the persistent storage can be part of a non-volatile memory such as a hard drive.

Some embodiments illustrate the multi-stage video compositing process as a "composite tree" formed by several nodes. Each particular node in this tree represents a particular stage in the video compositing process (i.e., represents a particular editing operation in the video compositing process). In some embodiments, the nodes are selectable items in a graphical user interface. In some of these embodiments, a user can select a particular node and initiate a background render process for this particular node, in order to render the result of the editing operation associated with the particular node. After such a rendering, the particular node changes color in some embodiments to indicate that its associated operation has been rendered and stored.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Overview

Some embodiments of the invention provide a method of editing video through a multi-stage editing process. The method selects a particular stage in the editing process. A particular editing operation is performed on a set of video images during the particular stage. After the selection of the particular stage, the method uses a background rendering process to render the result of the particular editing operation on the particular set of video images. The background rendering process is a process that the method performs separately from the multi-stage video editing process, so that a user may continue editing the video sequence while the rendering occurs. Some embodiments provide a preview of the rendering process in a preview window. Some of these embodiments update the preview in real time.

In some embodiments, the rendering occurs to a temporary location and then stores to a persistent storage. In some of these embodiments, an entry for the stored render's location is logged in a list of entries that allows the stored render to be catalogued and retrieved from the persistent storage. The temporary location and the persistent storage can be part of a non-volatile memory such as a hard drive.

Several more detailed embodiments of the invention are described below by reference to FIGS. 1-9. These embodiments are implemented by a video compositing application that illustrates the multistage video compositing process as a "composite tree" formed by several nodes. Each particular node in this tree represents a particular stage in the video compositing process (i.e., represents a particular editing operation in the video compositing process).

In some embodiments, the nodes are selectable items in a graphical user interface. In some of these embodiments, a user can select a particular node and initiate a background render process for this particular node, in order to render the result of the editing operation associated with the particular node. After such a rendering, the particular node changes color in some embodiments to indicate that its associated operation has been rendered and stored.

Some embodiments reserve local cache storage locations for the video composting application in the memory space (i.e., in the volatile memory and non-volatile storage) of the computer system. The local cache storage is allocated separately for the video-compositing process of the video-compositing application. In some embodiments, the user can modify the size of the local cache storage.

Some of these embodiments render a node to a temporary storage location and then store the rendered results to an external storage location, where the external storage location and the temporary storage locations are external to the local cache storage for the video-compositing process of the video-compositing application. The external and temporary storage locations are non-volatile storages (e.g., they are locations on the hard drive of the computer system) in some embodiments.

Some of these embodiments retrieve the rendered results from the external storage locations into the local cached storage locations whenever the video compositing application tries to retrieve cached results. Such caching is useful for rapid retrieval and review of video compositing results.

Section II below describes the process and architecture of some embodiments in further detail. Section III then describes the implementation of a user interface for some of these embodiments.

II. Background Render Process and Architecture

Figure 1:
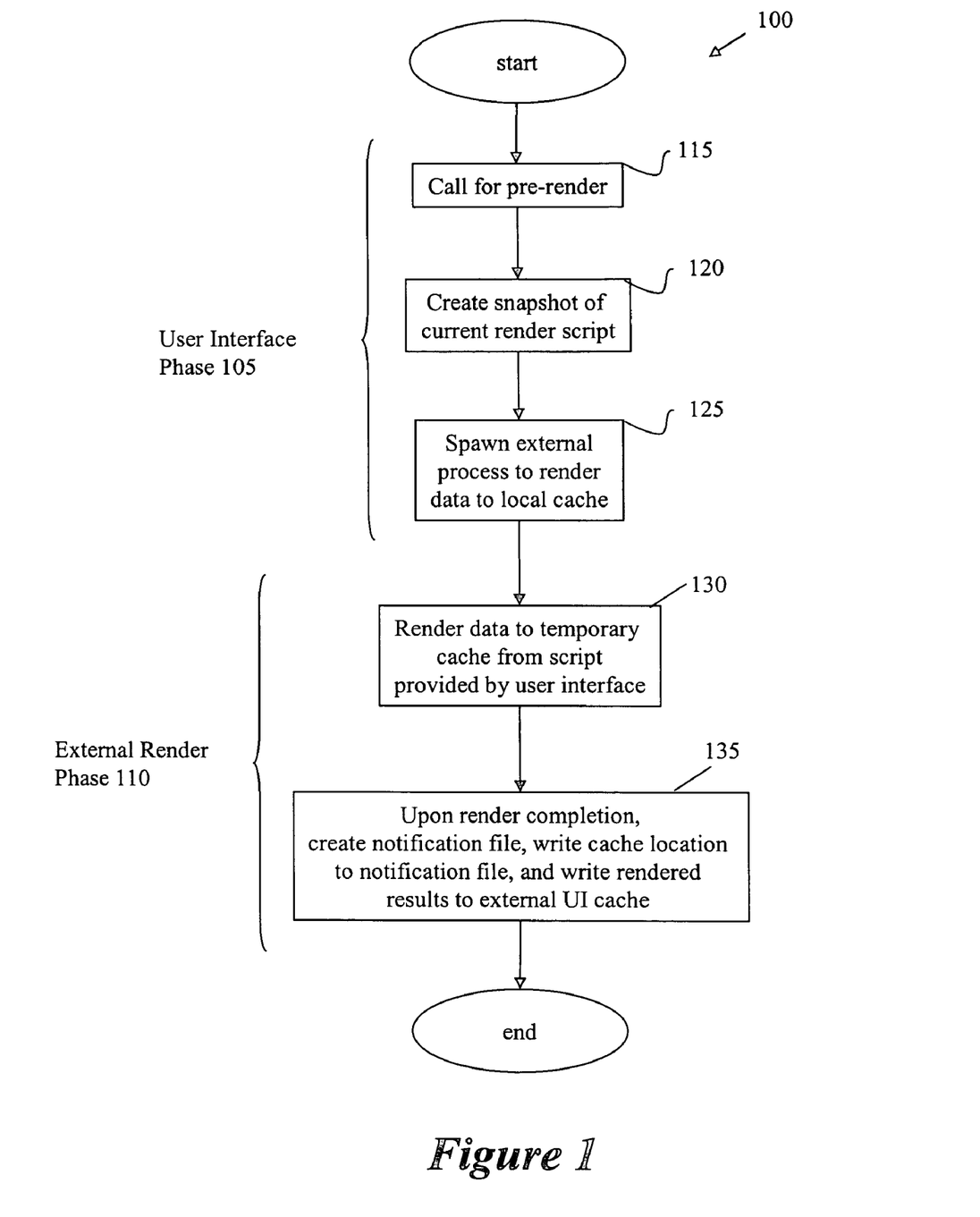
FIG. 1 illustrates a process flow for a user interface cache render that spawns an external cache render process.

FIG. 1 illustrates a background render process 100 of a user interface of some embodiments of the invention. As shown in this figure, the background render process 100 has two phases: (1) a user interface phase 105, and (2) an external render phase 110. The user interface phase 105 begins at step 115 when a request is made to pre-render a specified set of frames in a sequence of frames that the user is editing. As further described in Section III, some embodiments allow the user to request a forced render at a point in the video sequence by inserting a Cache Node in the video compositing tree and calling a function "Render Cache Nodes." Instead of, or in conjunction with such cache nodes, some embodiments might allow pre-rendering to be initiated by some other user request or automated process.

When the background render process 100 receives a call to render, the background render process 100 creates a snapshot of the current render script at step 120. This snapshot saves the state of the set of frames that are specified for rendering. The snapshot includes any video editing functions that have been applied to the set of frames.

Next, at step 125, the background render process 100 spawns an external process (1) to render the selected frames based on the state of the frames in the snapshot and (2) to store the rendering to a temporary location. The render script of some embodiments contains a unique identifier generated by using the particular stage in the editing process that calls for the render (i.e., the node in the node tree). In these embodiments, the unique identifier may be used to store and later retrieve the requested render.

The external render process 110 then renders (at 130) the frame to the temporary location by using the script provided by the user interface. Once the rendering is completed (at 135), the background render process 100 (at 135) transfers the rendered results into an external storage, creates a notification file, and writes in the notification file the location of the rendered results in the external storage. As further described below by reference to FIG. 4 the user interface later (1) realizes that rendered results exist in the external UI cache when it discovers the notification file, and (2) after this realization, updates the UI's local cache to include the rendered results before searching through the prior rendered results for a desired cached rendering.

In some embodiments, each rendering request spawns a separate external process, which creates a separate notification file and stores its rendered results to a separate location in the external storage. In these embodiments, multiple render requests can be performed at various times and stored and/or indexed upon completion. Moreover, each of these separate external processes can execute simultaneously as background processes while the user and system continue to perform other video compositing operations in the multi-stage video compositing process.

Figure 2:
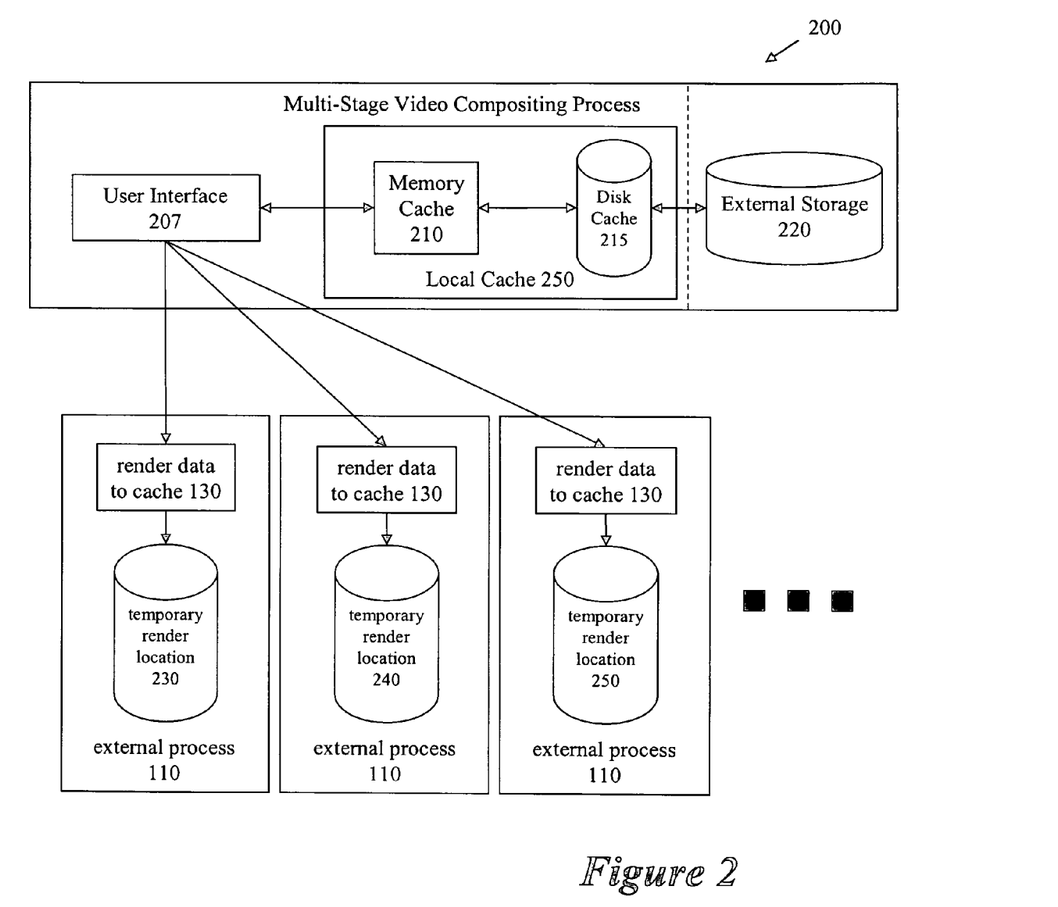
FIG. 2 illustrates an architecture for a user interface cache render that spawns multiple external cache render processes.

FIG. 2 illustrates a block diagram of a portion of a multi-stage video compositing process 200, which has spawned multiple external render processes 110. As shown in this figure, the user interface process includes a user interface 207 that presents a video-compositing tree to the user. Through this UI 207, the user can request certain nodes to be rendered in background through an external render process. The UI searches for rendered results in a local cache 250 that is formed by a memory cache 210 and a disk cache 215.

Figure 3:
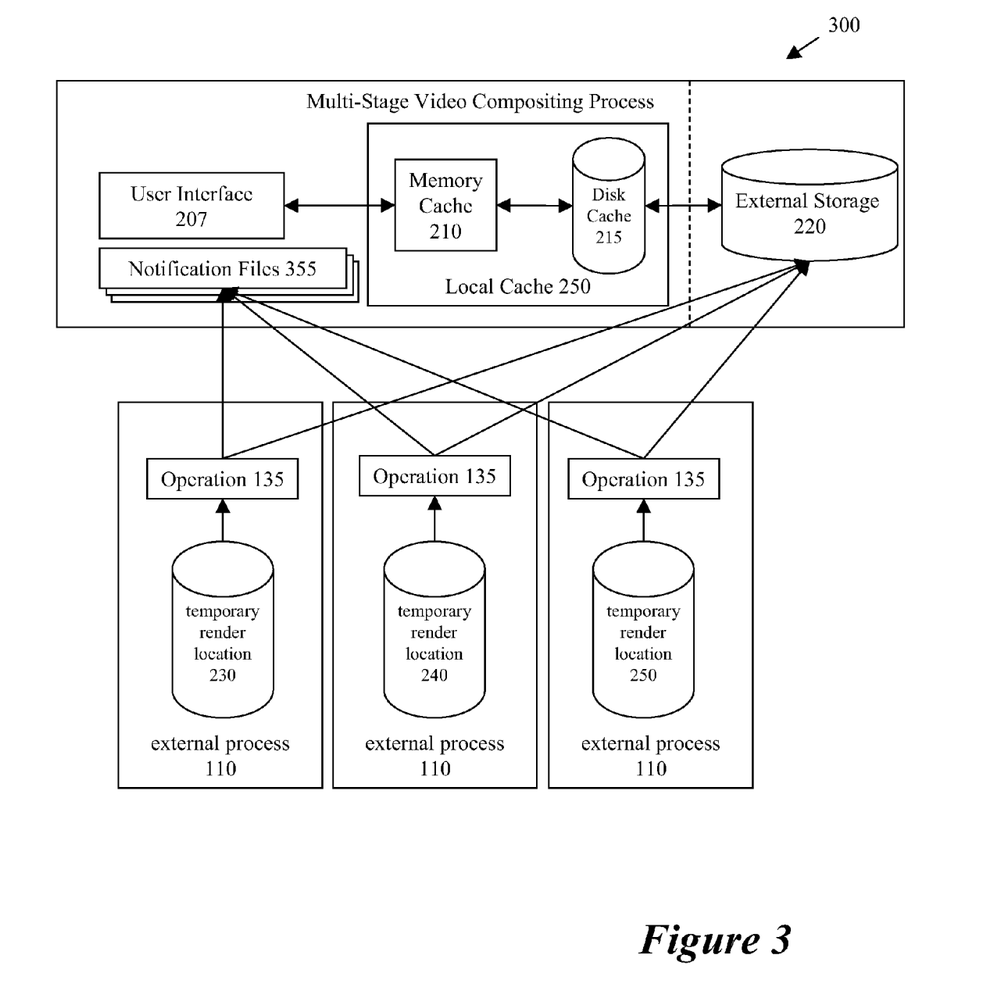
FIG. 3 illustrates completion of the external cache render processes.

As mentioned above, FIG. 2 illustrates several external render processes 110 that have been spawned by the UI. Each render process performs a render operation 130 to a temporary location (e.g., 230, 240, and 250). Once its render operation 130 is complete, the external process 110 performs the operation 135, as shown in FIGS. 1 and 3. As shown in these figures, the operation 135 (1) transfers the rendered results into an external storage 220, (2) creates a notification file 355, and (3) writes in the notification file 355 the location of the rendered results in the external storage 220.

As mentioned above, a notification file 355 informs the UI 207 that rendered results exist in the external storage, and that hence the UI's local cache has to be updated to include the rendered results before searching through the prior rendered results for a desired cached rendering. This realization and update will now be further described by reference to FIG. 4. This figure illustrates a retrieval process 400 that the video compositing application employs to search for previously rendered results in its local cache (formed by memory cache 210 and disk cache 215).

Figure 4:
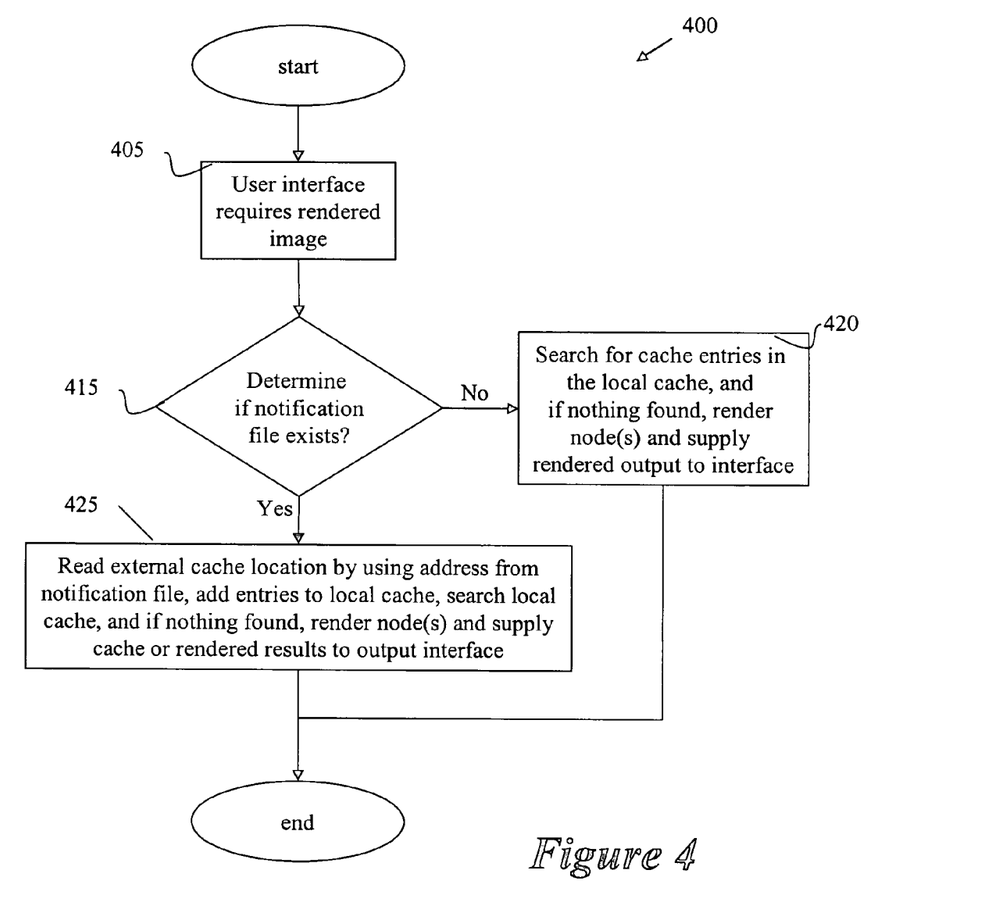
FIG. 4 illustrates a process flow for a user interface searching cache for data.

As shown FIG. 4, the process 400 starts when the user interface 207 requires the rendering of a node in the video compositing tree. As mentioned above, and further elaborated below, one example of such a node is a cache node that is inserted in the video compositing tree and is selected for background rendering.

In some embodiments, this requirement may arise due to an explicit request by the user of the user interface, or may be automatedly generated by the UI for the rendering of another node or for some other reason in the course of video editing. Regardless of how the rendering request is generated, the retrieval process 400 first tries to determine if the requested node was previously rendered. To do that, it has to search the UI's local cache 250 to determine whether it has rendered results for the requested node. However, before performing this search, the UI might first have to update its local cache 250.

Accordingly, the process determines (at 410) whether a notification file exists. If no such file exists, the retrieval process 400 searches (at 420) the UI's local cache 250 for an entry that matches a unique identifier for the requested node. In some embodiments, this unique identifier is generated based on the location of the node in the video compositing tree, and the values of the parameters of the video-compositing operations are represented by the requested node and all of its parent nodes in the tree. If the process 400 does not find (at 420) an entry for the requested data in the UI's local cache 250, then the retrieval process 400 performs a rendering operation (at 420) for the requested node and supplies the rendered results to the UI. On the other hand, when the process finds (at 420) an entry for the requested node, the process (at 420) retrieves the cached rendered results and supplies them to the UI.

When the process identifies one or more notification files at 410, the process (at 425) retrieves the address location(s) stored in the notification files and discards the notification files. The retrieved address location or locations identify places in the external storage 220 that store the results of previous background rendering operations that have not yet percolated to the local cache 250 of the UI. Hence, from the retrieved address location(s), the process then (at 425) retrieves the rendered results of one or more previous background rendering operations, and stores these rendered results in the local cache 250.

After updating the local cache at 425, the process then searches the UI's local cache 250 for an entry that matches a unique identifier for the requested node. If the process 400 does not find (at 425) an entry for the requested data in the UI's local cache 250, then the retrieval process 400 performs a rendering operation (at 425) for the requested node and supplies the rendered results to the UI. On the other hand, when the process finds (at 425) an entry for the requested node, the process (at 425) retrieves the cached rendered result and supplies it to the UI.

III. User Interface

Figure 5:
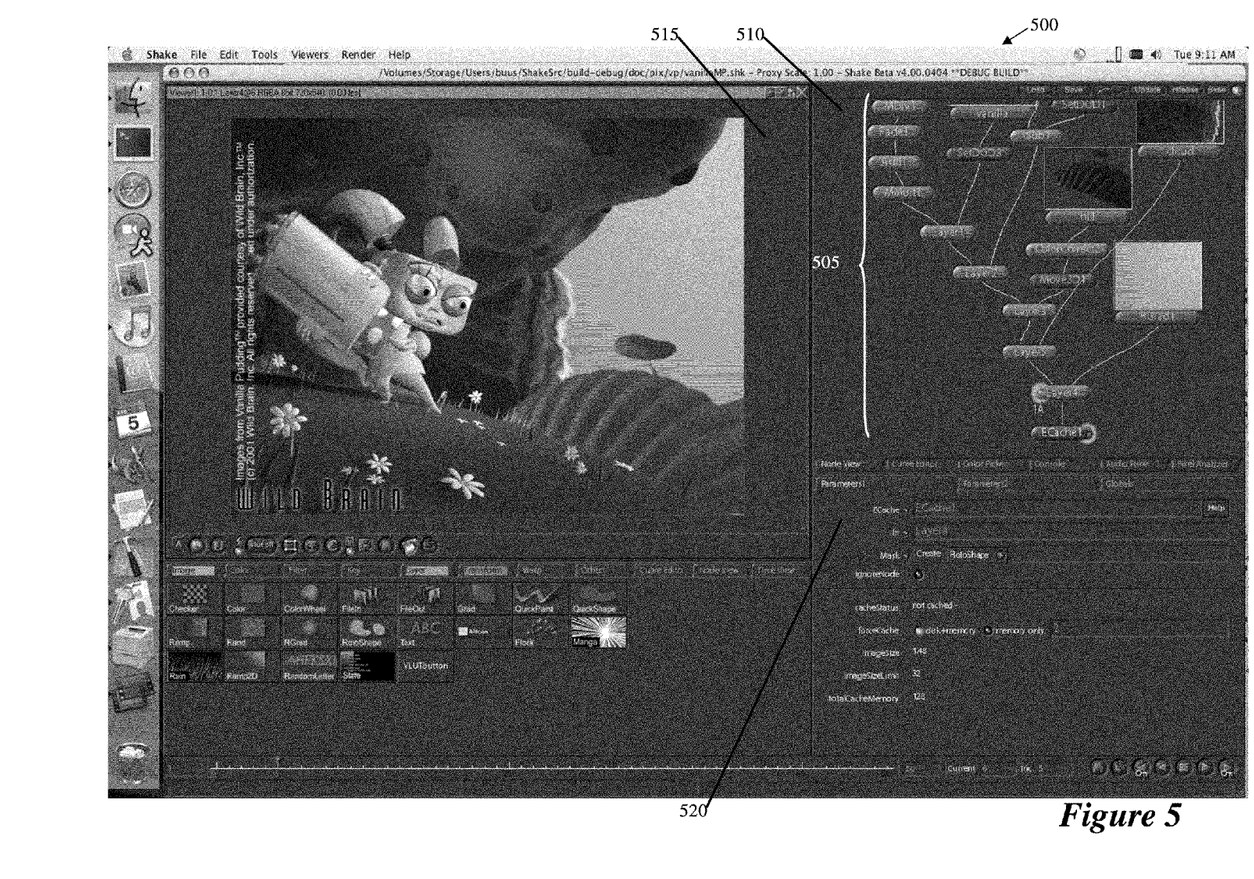
FIG. 5 illustrates a user interface containing an uncached node.

FIG. 5 illustrates a user interface 500 containing a video-composite node tree 505. The user interface includes a node view pane 510, a viewer pane 515, and a tweaker pane 520. The node tree 505 is illustrated in the node view pane 510 of the user interface 500. The node tree 505 represents the elements of a video sequence currently being edited including any functions applied to those elements. For instance, the node Layer 4 represents an element of a video sequence illustrated by the node tree 505. Since the node Layer 4 is connected directly or indirectly to all the nodes above it in the node tree 505, the node Layer 4 represents the culmination of all the nodes (e.g., all the elements and functions) above it in the node tree 505. As shown in this figure, an indicator light on the left of the node Layer 4 indicates that this node is currently active, i.e., currently previewed in the viewer pane 515 to facilitate a user's editing of the node Layer 4.

In FIG. 5, a user has manually inserted an external cache node "Ecache1" and linked this node to the node Layer 4. The node Ecache1 allows the user to apply a variety of caching functions to the node Layer 4 that facilitate the user's editing of the video sequence represented by the node tree 505. For instance, the user might select a forced render to cache of the node Layer 4 (and all the nodes in the tree "upstream" or connected in the tree above the node Layer 4). As mentioned above, some embodiments allow this rendering to be performed in a background process such that the user can continue editing the node tree 505 (e.g., adding or deleting nodes, changing the connections between the nodes, changing parameter values, etc.) while the render is being performed.

Also, as described above, some embodiments store the background render in an external storage and create an entry that specifies the location of the rendered results in the external storage for later retrieval by the UI during an update of its local cache. The ability to pre-render and cache one or more segments of a lengthy and complex video editing process (represented in some embodiments by one or more node trees, e.g., node tree 505) greatly improves video editing for the user and particularly reduces unproductive redundant processing and waiting time.

In some embodiments, the node Ecache1 glows red to indicate that this node cannot be loaded from a cache location. This might be because the node has not yet been rendered to a cache location. In these embodiments, this indicator conveys to a user that it may be useful to perform pre-rendering and caching of this node.

The user may click on the right of the node Ecache1 to view the parameters (including the caching parameters) associated with this node in the tweaker pane 520. In some embodiments, an indicator light on the right of the node Ecache1 indicates that this node's parameters are currently available for review and adjustment in the tweaker pane 520.

Figure 6:
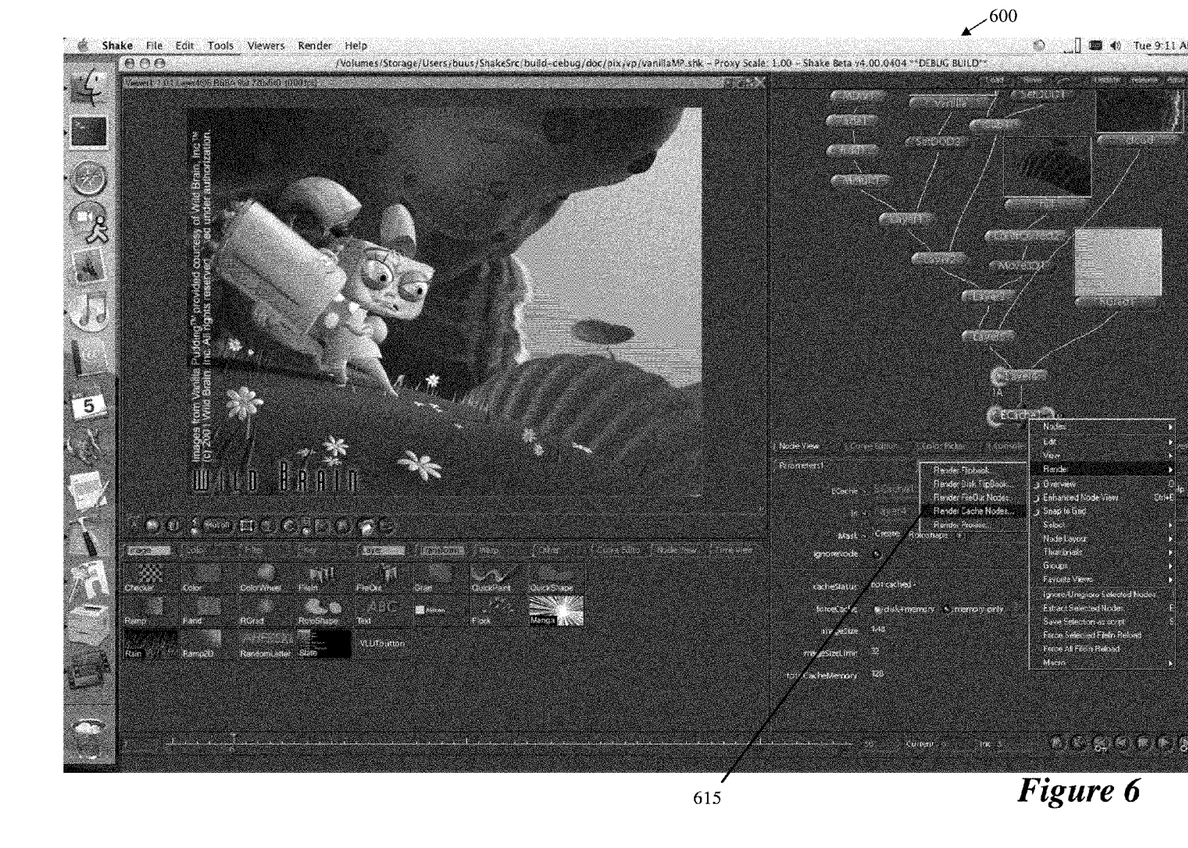
FIG. 6 illustrates a user interface with a drop down menu that includes a render selection and types of renders.

FIG. 6 illustrates one way for the user to initiate a forced render operation on the cache node. Specifically, it illustrates a user interface 600 with a drop down menu 605 that includes a render selection and types of renders. As shown in this figure, the user may select Render Flipbook, Render Disk Flipbook, Render FileOut Nodes, Render Cache Nodes, or Render Proxies from the Render drop down menu 605. In this example, the user has selected the "Render Cache Nodes" option.

Figure 7:
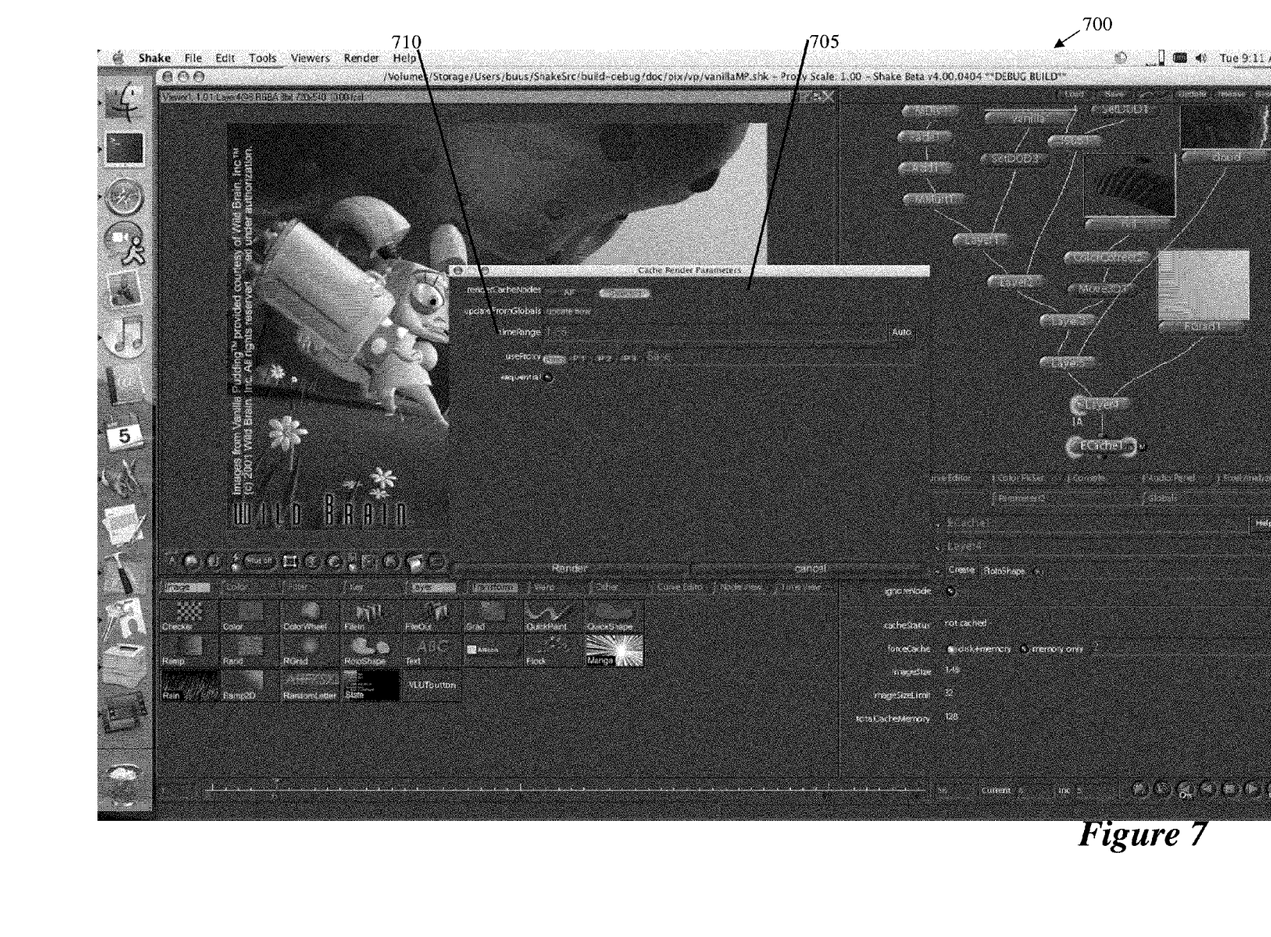
FIG. 7 illustrates a user interface including a dialog box for adjusting parameters of a render to cache function.

Once the user selects the "Render Cache Nodes" option, the user is presented with a dialog box 705 for adjusting parameters of a render to cache function, as shown in FIG. 7. As shown in this figure, some embodiments allow a user to specify all or select nodes for rendering. Some embodiments also allow the user to set the frame range within the video sequence of images currently being edited to render and store to a cache location. In some embodiments, this parameter is specified as a time range 710 for the video frames.

Some embodiments further allow the user to set the proxy level at which to render the selected frames. In some embodiments, the proxy level is the resolution level for the renders. As shown in the dialog box 705, these resolution levels could have pre-determined levels that include Base (full resolution), P1 (half resolution), P2 (quarter resolution), and P3 (one tenth resolution).

Some embodiments may allow the user to alter the pre-determined levels to any user setting. The embodiments described above give the user the advantages of speed and organization. For instance, by selecting groups of nodes or frames, the user may organize and store sections of the video sequence in separate cache locations or files meaningfully. Moreover, at times the user may wish to preview the editing work of a certain section of video without viewing the final output. Rendering a select group of frames or nodes at lower resolution can greatly accelerate the rendering and preview process. Some embodiments provide even greater user feedback and faster previews through a thumbnail preview of one or more current background render processes during run time.

Figure 8:
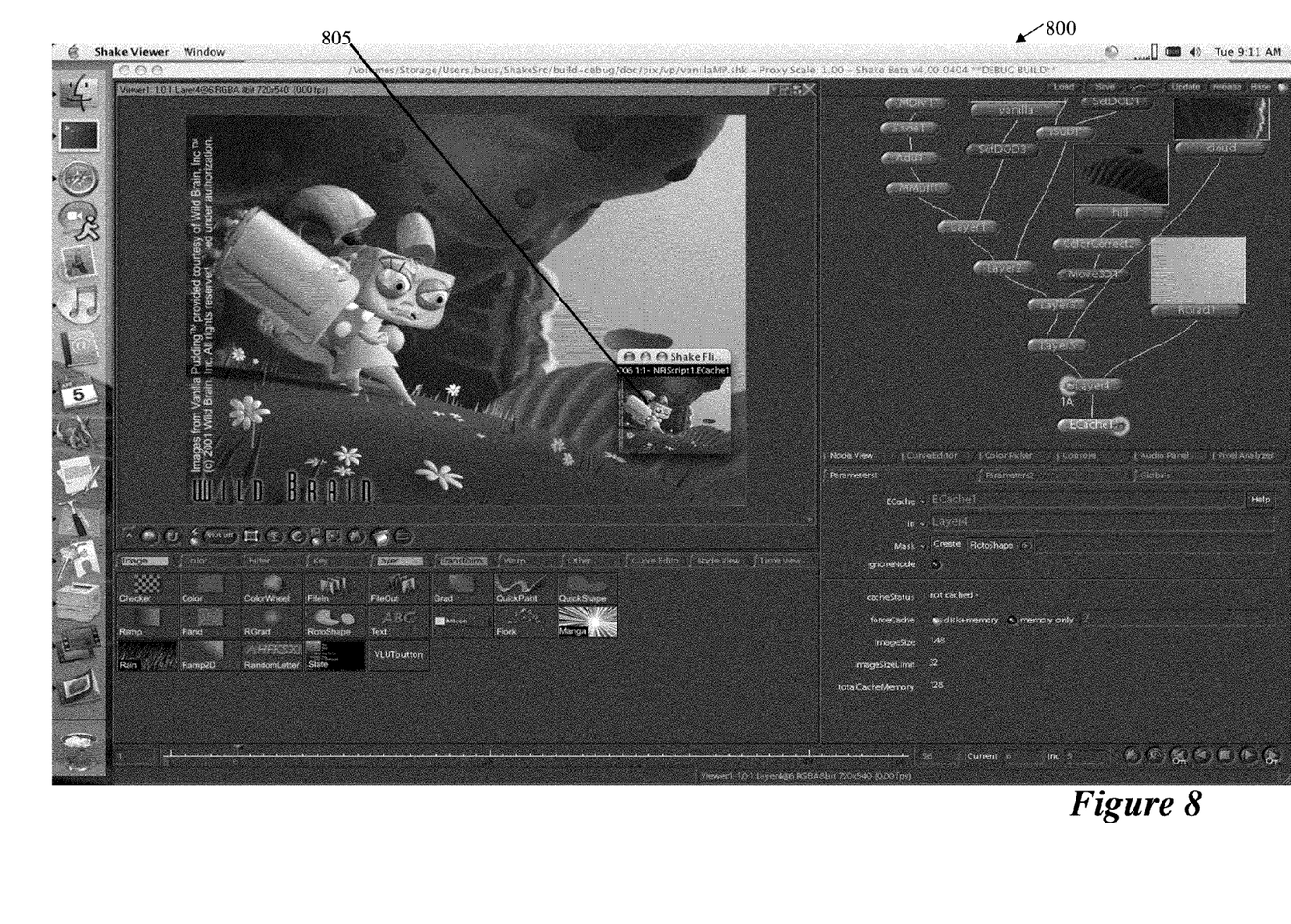
FIG. 8 illustrates a user interface including a thumbnail preview window of a background render process.
Figure 9:
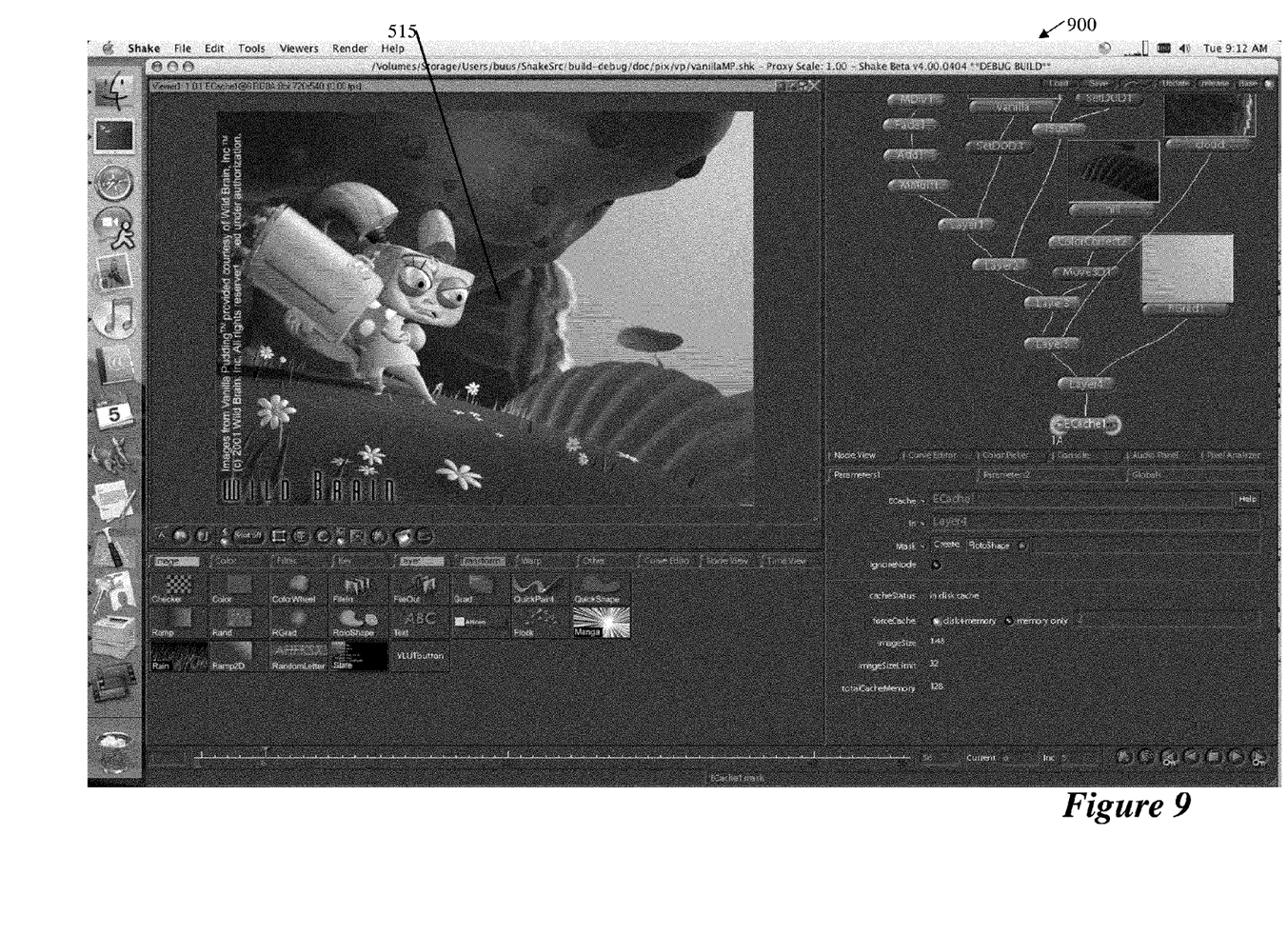
FIG. 9 illustrates a user interface containing a node that has an associated cached render.

Once the user has specified the desired caching parameters in the dialog box 705, the user can select the "Render" button in this dialog box to initiate the render operation. During this render operation, the user interface in some embodiments provides a thumbnail preview 805 of a background render process, as shown in FIG. 8. In some embodiments, this thumbnail preview 805 updates in real time to indicate to the user the progress of the background render process. As shown in FIG. 8, the node Ecache1 of some embodiments changes colors during the rendering, to indicate that this node is currently being rendered in a background process. In these embodiments, the node Ecache1 will assume the default color for nodes when the background render process is complete and the node becomes available from a cache location, as shown in FIG. 9.

FIG. 10 presents a computer system with which one embodiment of the invention is implemented. Computer system 1000 includes a bus 1005, a processor 1010, a system memory 1015, a read-only memory 1020, a permanent storage device 1025, input devices 1030, and output devices 1035. The bus 1005 collectively represents all system, peripheral, and chipset-buses that communicatively connect the numerous internal devices of the computer system 1000. For instance, the bus 1005 communicatively connects the processor 1010 with the read-only memory 1020, the system memory 1015, and the permanent storage device 1025.

From these various memory units, the processor 1010 retrieves instructions to execute and data to process in order to execute the processes of the invention. The read-only-memory (ROM) 1020 stores static data and instructions that are needed by the processor 1010 and other modules of the computer system.

The permanent storage device 1025, on the other hand, is read-and-write memory device. This device is a non-volatile memory unit that stores instruction and data even when the computer system 1000 is off. Some embodiments of the invention use a mass-storage device (such as a magnetic or optical disk and its corresponding disk drive) as the permanent storage device 1025.

Other embodiments use a removable storage device (such as a floppy disk or Zip® disk, and its corresponding disk drive) as the permanent storage device. Like the permanent storage device 1025, the system memory 1015 is a read-and-write memory device. However, unlike storage device 1025, the system memory is a volatile read-and-write memory, such as a random access memory. The system memory stores some of the instructions and data that the processor needs at runtime. In some embodiments, the invention's processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include alphanumeric keyboards and cursor-controllers. The output devices 1035 display images generated by the computer system. For instance, these devices display the GUI of a video editing application that incorporates the invention. The output devices include printers and display devices, such as cathode ray tubes (CRT) or liquid crystal displays (LCD).

Finally, as shown in FIG. 10, bus 1005 also couples computer 1000 to a network 1065 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1000 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, the embodiments described above may be implemented in one or more modules separately or as part of an application, e.g., the Shake® application provided by Apple Computer, Inc. Thus, one of ordinary skill in the art will understand that the invention is not to be limited by the foregoing illustrative details, but rather is to be defined by the appended claims.

I claim:

1. A method for editing video, said method comprising:
   receiving a selection of an editing stage in a multi-stage video editing process;
   receiving a request from a user to background render at least a portion of the video up to said selected stage;
   launching an external process to render said portion of the video; and
   while said external process is executing to render said portion, receiving and performing an edit to a particular editing stage in the multi-stage editing process.

2. The method of claim 1, wherein said selected editing stage specifies a video editing operation for said video.

3. The method of claim 1 further comprising generating an identifier for associating said selected stage in said video editing process with said rendering of said selected stage.

4. The method of claim 3, wherein said identifier is used to retrieve said rendering.

5. The method of claim 3, wherein said identifier comprises a string that identifies the location of the selected stage in the multi-stage video compositing process.

6. The method of claim 1, wherein said rendering occurs to one or more locations.

7. The method of claim 6, wherein an entry for said one or more locations is stored.

8. The method of claim 7, wherein said entry is used for retrieving said rendering from said one or more locations.

9. The method of claim 6, wherein said one or more locations comprise non-volatile memory.

10. The method of claim 1 further comprising providing a preview of an output of said rendering.

11. The method of claim 10, wherein said preview is updated in real time.

12. The method of claim 1, wherein said stage in said video editing process is represented by a node.

13. The method of claim 12, wherein said user request is represented in a tree of nodes by a cache node.

14. The method of claim 1, wherein said edit to the particular editing stage comprises at least one of (i) a deletion of the particular editing stage and (ii) an addition of another editing stage connected to the particular editing stage.

15. The method of claim 1, wherein said edit to the particular editing stage comprises a change in a connection between the particular editing stage and another editing stage.

16. The method of claim 1, wherein said edit to the particular editing stage comprises a change in a parameter value of the particular editing stage.

17. The method of claim 1, wherein the particular editing stage is a different editing stage from the selected stage.

18. A computer readable medium storing a computer executable program for editing video, said computer executable program comprising sets of instructions for:
   receiving a selection of an editing stage in a multi-stage video editing process;
   receiving a request from a user to background render at least a portion of the video up to said selected stage;

launching an external process to render said portion of the video; and while said external process is executing to render said portion, receiving and performing an edit to a particular editing stage in the multi-stage editing process.

19. A video editing method comprising:

receiving a selection of an editing stage in a multi-stage editing project;

receiving a selection of a particular rendering parameter out of a plurality of rendering parameters for performing a background rendering of the selected editing stage;

rendering said portion of the video up to said selected stage using the particular rendering parameter; and while background rendering said portion receiving and performing a modification to said multi-stage editing project;

wherein the plurality of rendering parameters comprises a plurality of candidate rendering resolutions, wherein each candidate rendering resolution provides a resolution at which the portion is rendered.

20. The method of claim 19, wherein the plurality of candidate resolutions comprises at least (i) a full first resolution and (ii) a second resolution that is less than the full resolution.

21. The method of claim 20, wherein the second resolution is one of a one-half resolution and a one-quarter resolution.

22. A video editing method comprising:

receiving a request to cache an editing stage in a multi-stage video editing project;

receiving a selection of a particular rendering resolution from a plurality of candidate resolutions, each candidate resolution providing a different resolution for a rendering of the editing stage;

rendering, to a cache storage, said portion of the video up to said selected stage at said selected rendering resolution; and receiving and performing an edit to the multi-stage video editing project.

23. A video editing method comprising:

receiving a selection of an editing stage in a multi-stage editing project;

receiving a selection of a particular rendering parameter out of a plurality of rendering parameters for performing a background rendering of the selected editing stage;

rendering said portion of the video up to said selected stage using the particular rendering parameter; and while background rendering said portion receiving and performing a modification to said multi-stage editing project;

wherein the plurality of rendering parameters comprises a user-modifiable duration of the video to render.

24. The method of claim 23, wherein the duration is expressed in terms of time.

25. The method of claim 23, wherein the duration is expressed in terms of frames.

* * * * *